United States Patent
Stilgenbauer et al.

(10) Patent No.: US 10,280,835 B2
(45) Date of Patent: *May 7, 2019

(54) EXHAUST-GAS TURBOCHARGER

(71) Applicant: BorgWarner Inc., Auburn Hills, MI (US)

(72) Inventors: Michael Stilgenbauer, Bolanden (DE); Matthias Ruh, Offenheim (DE); Gerald Schall, Bobenheim-Roxheim (DE)

(73) Assignee: BorgWarner Inc., Auburn Hills, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/814,859

(22) Filed: Nov. 16, 2017

(65) Prior Publication Data

US 2018/0073425 A1  Mar. 15, 2018

Related U.S. Application Data

(62) Division of application No. 14/412,721, filed as application No. PCT/US2013/049222 on Jul. 3, 2013, now Pat. No. 9,869,238.

(30) Foreign Application Priority Data

Jul. 11, 2012 (DE) .......... 10 2012 013 765

(51) Int. Cl.
  *F01D 11/00* (2006.01)
  *F01D 17/10* (2006.01)
  *F02B 37/18* (2006.01)
(52) U.S. Cl.
  CPC .......... *F02B 37/183* (2013.01); *F01D 11/005* (2013.01); *F01D 17/105* (2013.01); *F02B 37/186* (2013.01); *F05D 2220/40* (2013.01); *Y02T 10/144* (2013.01)

(58) Field of Classification Search
  CPC .... F01D 11/005; F01D 17/105; F02B 37/183; F02B 37/186; F05D 2220/40; Y02T 10/144
  See application file for complete search history.

(56) References Cited

U.S. PATENT DOCUMENTS 7,644,583 B2 * 1/2010 Leavesley ............... F02B 37/18
  415/156
2012/0055154 A1 * 3/2012 Ebert .................... F01D 17/105
  60/602

FOREIGN PATENT DOCUMENTS

DE  102010007600 A1 * 8/2011 .............. F02B 37/18

* cited by examiner

*Primary Examiner* — Brandon D Lee
(74) *Attorney, Agent, or Firm* — Eric L. Doyle; Stephan A. Pendorf; Patent Central LLC

(57) ABSTRACT

An exhaust-gas turbocharger (1), with a turbine housing (2) which has a turbine housing inlet (8) and a turbine housing outlet (9) for exhaust gas, and which has a wastegate duct (45) between the turbine housing inlet (8) and the turbine housing outlet (9), and a flap arrangement (33) comprising a pivotable flap lever (35), a flap plate (34), which is connected to the flap lever (35), for opening and closing the wastegate duct, and having a spring element (37) which is arranged between the flap lever (35) and a disc (36) fastened to the flap plate (34). The spring element (17) has an outer circumferential region (23) which is supported on a sliding contact surface (42), which is of curved form, of the disc (36).

9 Claims, 7 Drawing Sheets

EXHAUST-GAS TURBOCHARGER

BACKGROUND OF THE INVENTION

Field of the Invention

The invention relates to an exhaust-gas turbocharger having a turbine housing, which has a turbine housing inlet and a turbine housing outlet for exhaust gas, and which has a wastegate duct between the turbine housing inlet and the turbine housing outlet, and which further has a flap arrangement including a pivotable flap lever and a flap plate, which is connected to the flap lever, for opening and closing the wastegate duct.

Description of the Related Art

For charge pressure control, the generic exhaust-gas turbocharger known from WO 2010/135104 is provided with a wastegate duct which connects the turbine inlet to the turbine outlet while bypassing the turbine wheel. When the required charge pressure is attained, at least a part of the exhaust-gas flow can be conducted past the turbine or past the turbine wheel through said wastegate or bypass duct. To open and close said wastegate duct, there is provided a wastegate flap which is also referred to as a charge pressure control flap. The charge pressure control flap is connected via a linkage to an actuator which may for example be in the form of a pneumatic control capsule or electric controller.

In the embodiment of FIG. 3 of WO 2010/135104, a spring element is arranged between a flap lever or a spindle and a disc which is fastened to the flap plate. Here, the spring element is supported by way of its outer circumferential region on the planar abutment surface of the spindle. If an oblique position of the flap plate relative to the spindle arises in particular during operation of the exhaust-gas turbocharger, either the preload force of the spring element may change over the circumference thereof, or the spring element may, with corresponding configuration, counteract such an oblique position, which can then however lead to leakage between the flap plate and wastegate opening.

It is therefore an object of the present invention to provide an exhaust-gas turbocharger of the type having a turbine housing, which has a turbine housing inlet and a turbine housing outlet for exhaust gas, and which has a wastegate duct (45) between the turbine housing inlet and the turbine housing outlet, and which further has a flap arrangement including a pivotable flap lever and a flap plate, which is connected to the flap lever, for opening and closing the wastegate duct, which exhaust-gas turbocharger makes it possible, when the flap plate is open, to generate vibration damping, and when the flap plate is closed, even in the case of an oblique position, to attain a high degree of sealing by means of uniform contact pressure over the circumference of the flap plate and of the wastegate duct opening.

BRIEF SUMMARY OF THE INVENTION

This object is achieved by providing the exhaust-gas turbocharger of the above-described type with a spring element which is arranged between the flap lever and a disc fastened to the flap plate, wherein the spring element has an outer circumferential region which is supported on a sliding contact surface, which is of curved form, of the flap lever.

Since, as a result of the provision of a spring element between the flap plate and the spindle, there is a preload force between said two parts, vibration damping of the flap plate in the open position can be attained.

The sealing action of the flap plate with respect to the turbine housing in the closed position with a virtually unchanged preload even in the case of an oblique position of the flap plate relative to the spindle is attained in that the outer circumferential region of the spring element rests on a sliding contact surface, which is of curved form, of the spindle or of the flap lever.

In this way, it is possible for the outer circumferential region of the spring element to slide unhindered along the sliding contact surface in the event of an oblique position, because said sliding contact surface is formed so as to be entirely free from stops, such that there is no significant change in preload force even in the event of an oblique position.

It may preferably be provided that the flap plate bears against the flap lever only via a line of contact. Here, the "line of contact" is to be regarded as an idealized description. The contact between the flap plate and the flap lever is ultimately attained by means of a corresponding design of the two contact surfaces.

In a preferred embodiment, the flap plate comprises a projection which protrudes into a opening in the flap lever. As a result of this arrangement, the two mutually opposite contact surfaces are of annular form. Accordingly, the line of contact between the flap plate and flap lever is also circular. On that side of the flap lever which faces away from the wastegate duct, the disc is preferably fastened (riveted or welded) to the projection. The spring element may be braced between the disc and the flap lever.

By means of the design according to the invention of the contact surfaces between the flap lever and flap plate, it is possible firstly to ensure reliable abutment of the flap plate against the wastegate duct, and secondly, a "clanking effect" caused by vibration excitation in the open flap position is prevented.

A spring element that should preferably be used has a plurality of (preferably at least three) radially projecting spring arms. The spring arms are free, and not connected to one another, at their radially outer ends. The spring element that is used can thus be described as an "octopus-shaped spring". Alternatively, use may also be made of a closed spring element in the manner of a curved washer.

The spring arms of the spring element or the closed spring element bear/bears against the sliding contact surface of the disc. Said surface is particularly preferably of convex form. Said "spherical-design seat" for the spring arms ensures that, when spring force is applied, there is still adequate flexibility to ensure a sealing action of the flap plate against the flap plate seat in the turbine housing. Said characteristic must be provided both at room temperature and also at hot-gas temperature. Furthermore, during turbocharger operation on the engine or in the vehicle, a "clanking effect" should be prevented, primarily in the transient range, in the open flap position. Said prevention is assisted by the spring element. When the flap is open, a certain natural resonance is generated which excites the flap plate construction according to the prior art, without the corresponding spring element, such that said flap plate construction performs vibrations, resulting in constant and high-frequency component contact, with the outcome of "clanking noises" on the engine.

In a further particularly preferred embodiment, the flap arrangement has a flap shaft which is rotatably mounted in the turbine housing in a bushing, wherein the flap lever is rotationally conjointly connected to the flap shaft at one end of the latter. An outside lever of the flap arrangement is fastened to the other end of the flap shaft. At the second free end of the outside lever, the latter is connected to a control rod of an actuator for the actuation of the flap arrangement. In said preferred embodiment, a further spring element is provided which is arranged between the first end of the outside lever and the end surface of the bushing. Said second spring element also has an outer circumferential region which is supported on an end-side sliding contact surface, of curved form, of the bushing of the flap shaft. Said arrangement yields the possibility of damping of rotary oscillations of the flap shaft, because in the event of such an exertion of rotary oscillations, which may be introduced for example by the control rod or the flap plate, the spring element can rub against the end-side sliding contact surface of the bushing, which leads to the desired rotary oscillation damping.

Axial oscillations, which may be introduced for example by the engine on which the exhaust-gas turbocharger is used, are intercepted by the preload of the spring element.

The design according to the invention of the exhaust-gas turbocharger permits the use of only one spring element between the disc and the flap lever or between the bushing and the outside lever, and also the use of two such spring elements in the manner described above.

BRIEF DESCRIPTION OF THE SEVERAL VIEWS OF THE DRAWINGS

Further details, advantages and features of the present invention become apparent from the following description of exemplary embodiments with reference to the drawing, in which.

DETAILED DESCRIPTION OF THE INVENTION

Figure 1:
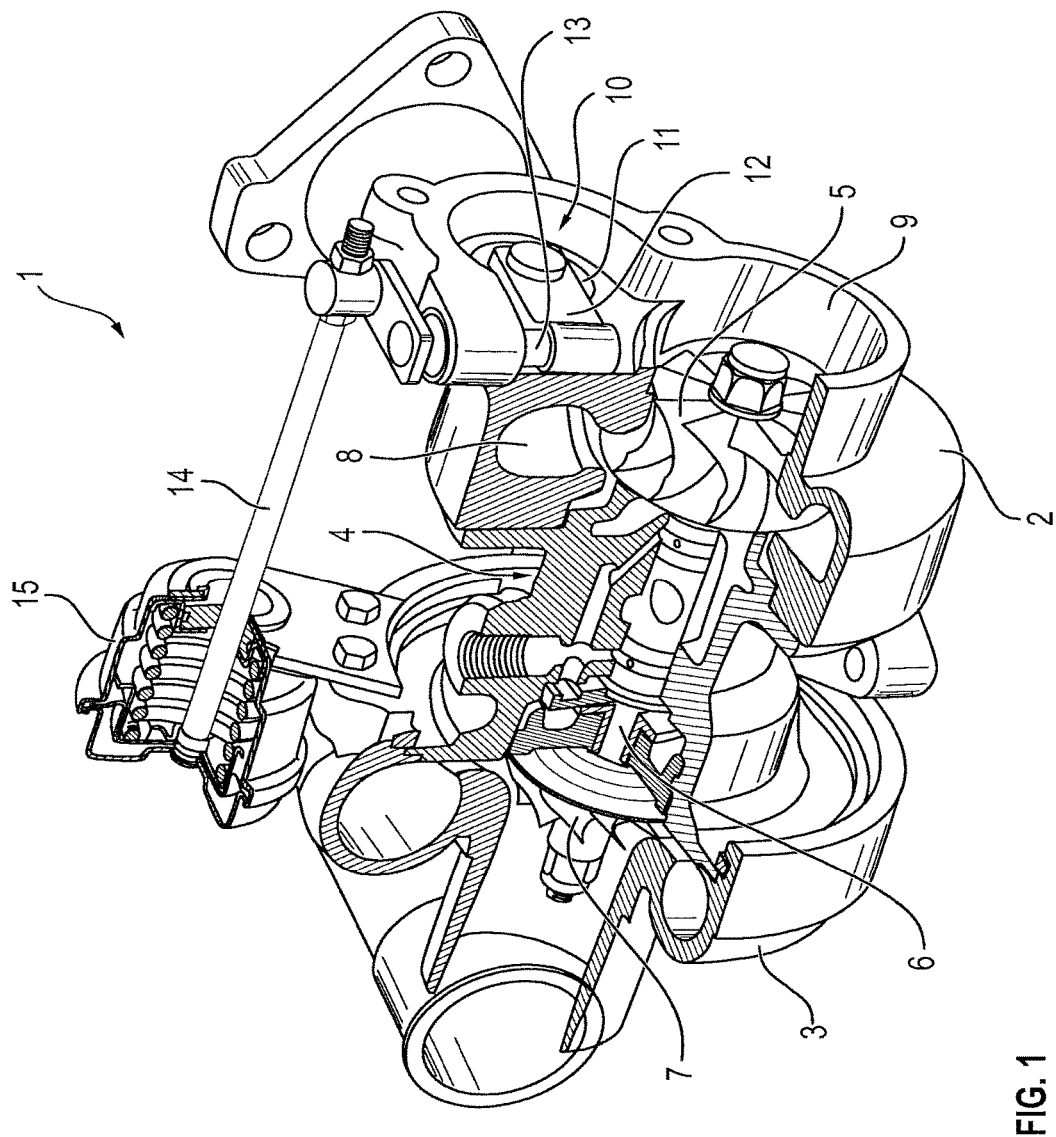
FIG. 1 shows an exhaust-gas turbocharger according to the invention as per a first exemplary embodiment.

FIG. 1 shows an exhaust-gas turbocharger 1 in a partially cut-away illustration. As per FIG. 1, the exhaust-gas turbocharger 1 comprises a turbine housing 2, a compressor housing 3 and a bearing housing 4 arranged between the turbine housing 2 and the compressor housing 3. A turbine wheel 5 is arranged in the turbine housing 2. A shaft 6 is rotatably mounted in the bearing housing 4. A compressor wheel 7 is situated in the compressor housing 3. The turbine wheel 5 and the compressor wheel 7 are rotationally conjointly mounted on the shaft 6. Exhaust gas is introduced via a turbine housing inlet 8. Said exhaust gas flows to the turbine wheel 5 and exits the arrangement via a turbine housing outlet 9. The turbine wheel 5 is set in rotation by the exhaust gas. The compressor wheel 7 is thus also set in rotation via the shaft 6. Charge air for an internal combustion engine is compressed by means of the compressor wheel 7.

A wastegate duct 45 is formed in the turbine housing 2. Via said wastegate duct, the exhaust gas can be conducted directly from the turbine housing inlet 8 to the turbine housing outlet 9, bypassing the turbine wheel 5. The wastegate duct can be closed off by means of a flap arrangement 10.

The flap arrangement 10 comprises a flap plate 11. Said flap plate 11 bears sealingly against the turbine housing 2, and thus closes off the wastegate duct, when the flap arrangement 10 is in the closed state.

The flap plate 11 is connected to a flap shaft 13 via a flap lever or a spindle 12. The flap shaft 13 is arranged rotatably in the turbine housing 2. The flap shaft 13 is connected, at the outer end thereof, to an outside lever which, at its free end, is in turn connected to the control rod 14 illustrated in FIG. 1, which control rod is moved by the actuator 15.

Figure 2:
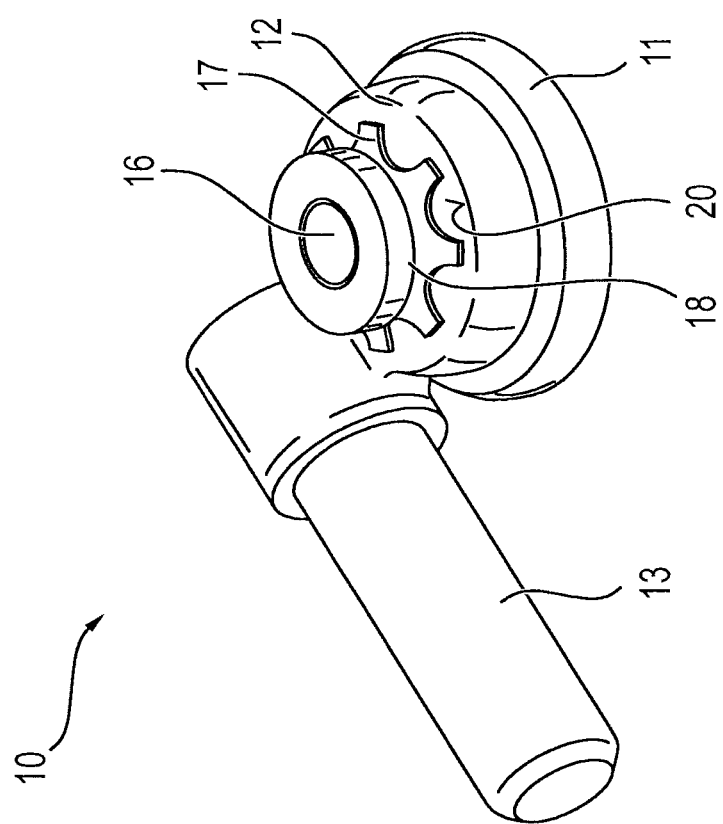
FIG. 2 shows an isometric view of a flap arrangement of the exhaust-gas turbocharger according to the invention as per the first exemplary embodiment.
Figure 3:
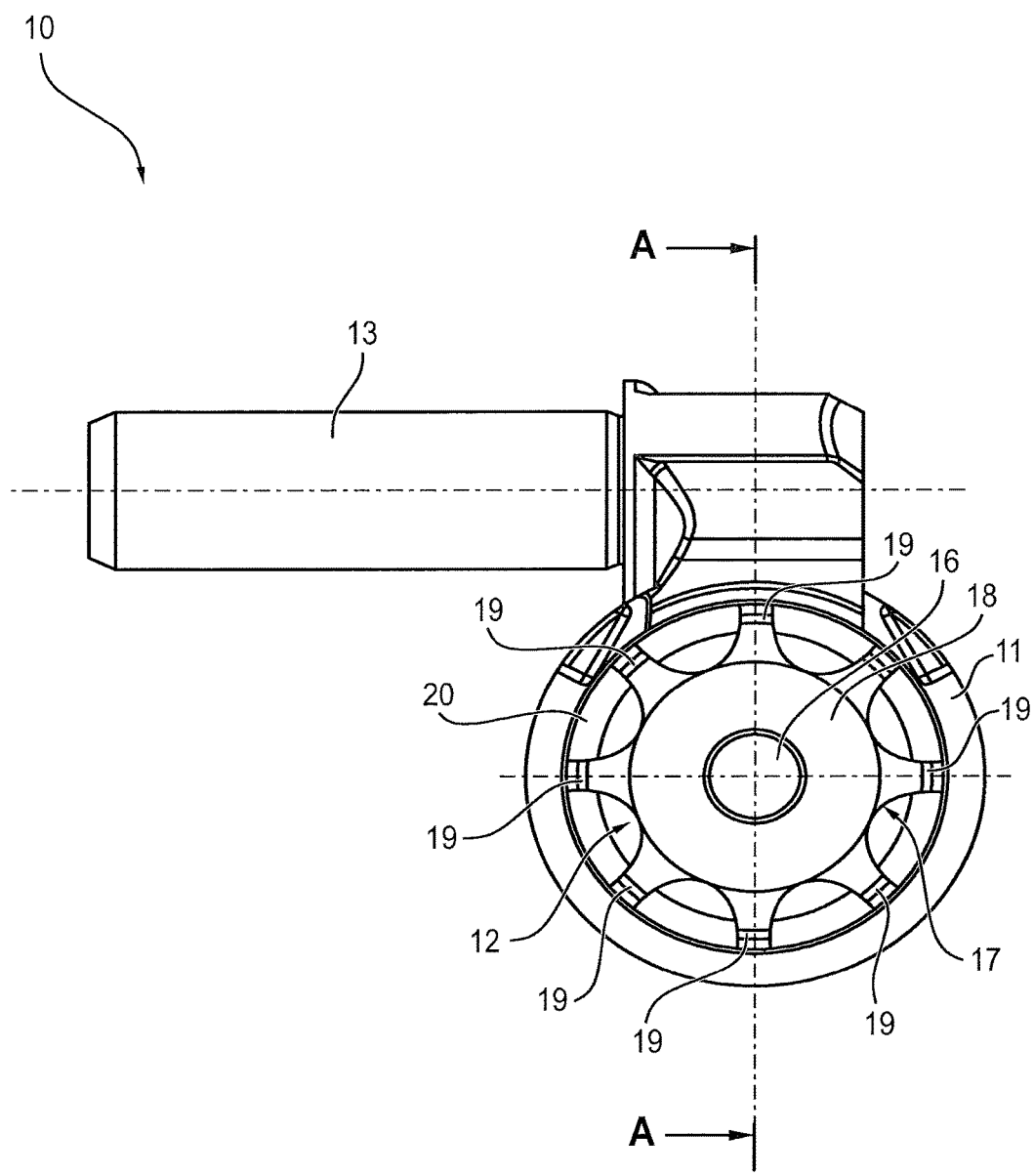
FIG. 3 shows a plan view of the flap arrangement from FIG. 2.
Figure 4:
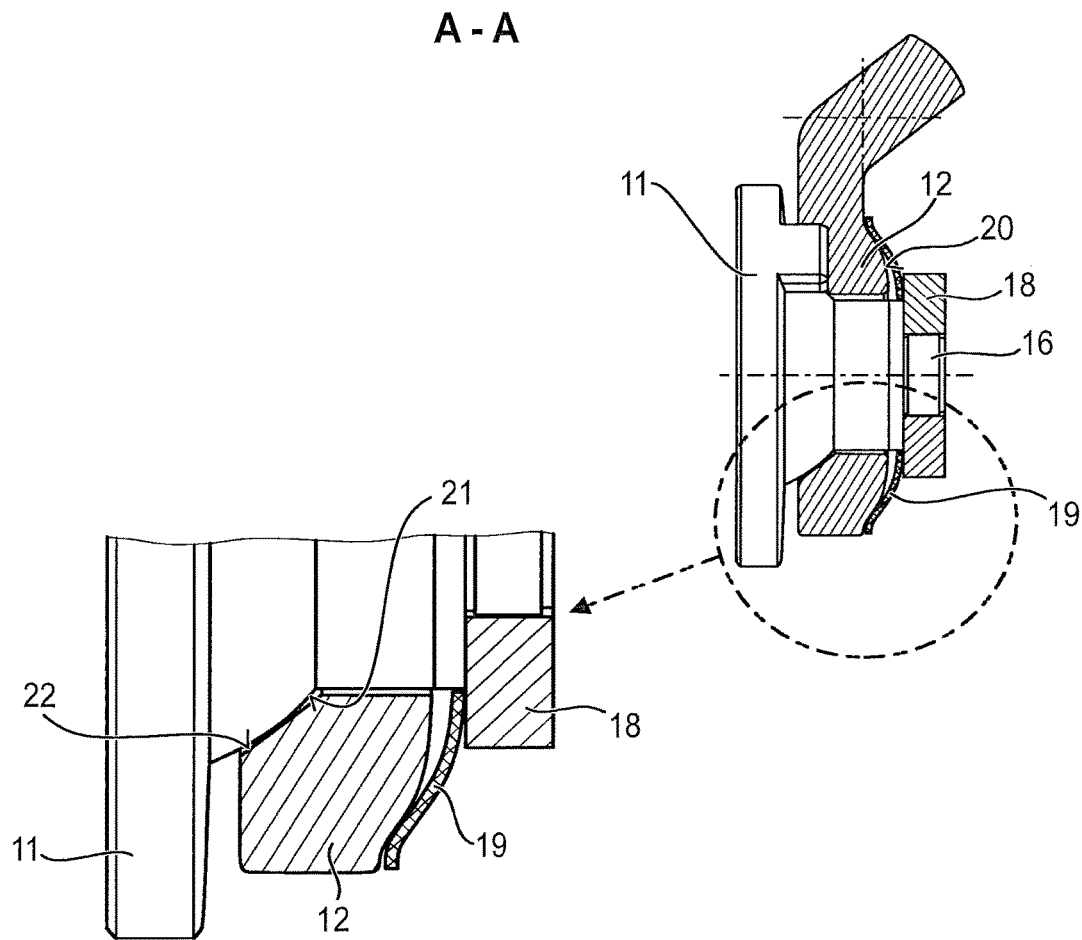
FIG. 4 shows a sectional view with a detail view with respect to FIG. 3.

FIG. 2 shows an isometric view of the flap arrangement 10 from FIG. 1. FIG. 3 shows a plan view of the same flap arrangement 10. FIG. 4 shows a section A-A indicated in FIG. 3. Furthermore, in FIG. 4, a detail is also indicated and illustrated on an enlarged scale on the left-hand side.

The flap plate 11 has a projection 16. By way of said projection 16, the flap plate 11 protrudes into a opening 24 of the flap lever 12 (see FIG. 5). On that side of the flap lever 12 which faces away from the wastegate duct 45, a disc 18 is fastened to the projection 16. The disc 18 braces a spring element 17 between the disc 18 and the flap lever 12.

Figure 5:
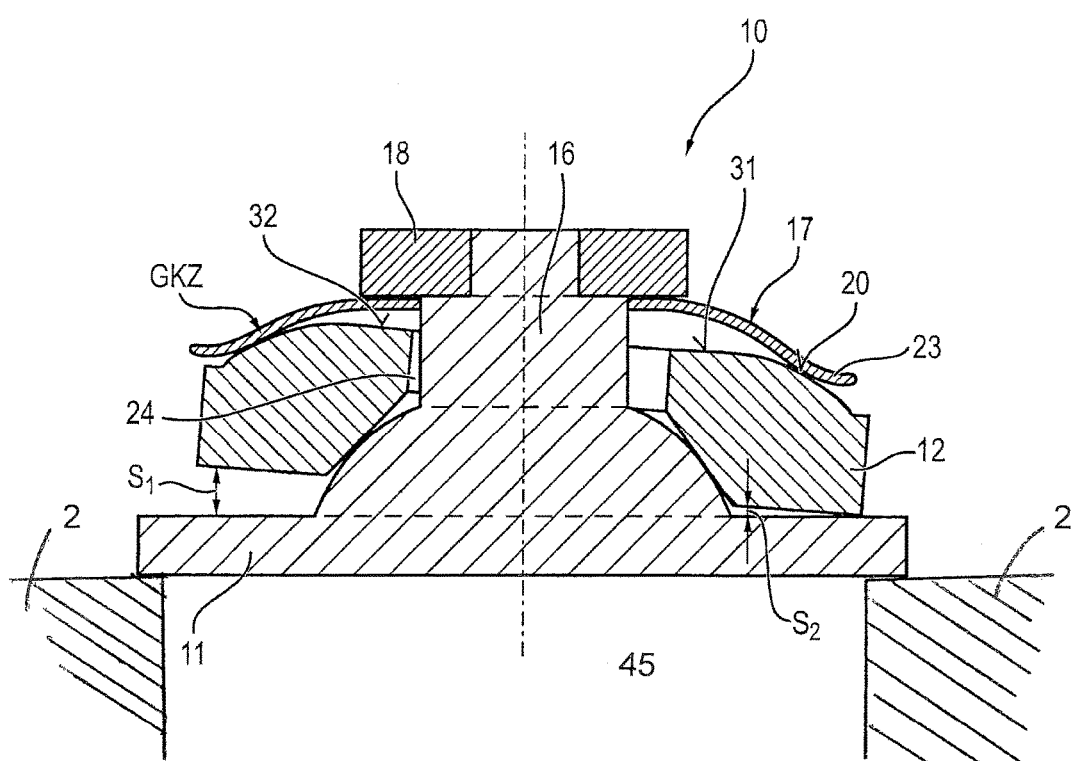
FIG. 5 shows an enlarged sectional illustration of the flap arrangement according to the invention in the case of an oblique position between flap plate and flap lever.

In the example illustrated, the spring element 17 comprises eight individual radially projecting spring arms 19. Each spring arm 19 bears against a sliding contact surface 20, which is of curved form and of preferably spherical or ball-shaped form, of the flap lever or of the spindle 12. In this regard, reference is made in particular to the illustration of FIG. 5. Said figure shows that, in the case of an oblique position between the flap lever 12 and the flap plate 11, illustrated by the difference in size of the amounts of play $S_1$ and $S_2$, an outer circumferential region 23 of the spring element 17 can slide freely along the sliding contact surface 20 of curved form. Said sliding contact surface 20 adjoins a planar region 31 of the top side 32, which faces toward the disc 18, of the spindle 12. Here, FIG. 5 shows, in the left-hand region thereof, that the outer circumferential region 23 can slide or deflect freely along said sliding contact surface 20, because no stop which could prevent such a movement is provided. In this way, the advantages explained in the introduction, in particular a virtually unchanged preload force even in the event of an oblique position and an intense sealing action, are attained.

Figure 8:
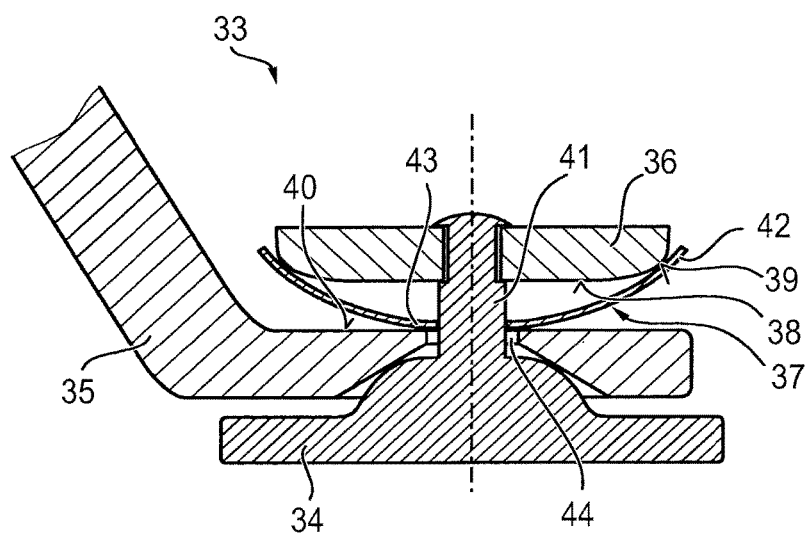
FIG. 8 shows an illustration, corresponding to FIG. 5, of an alternative embodiment of the flap arrangement according to the invention.

FIG. 8 illustrates an alternative embodiment of a flap arrangement 33 which has a pivotable flap lever 35, a flap plate 34 which is connected to the flap lever 35 and which serves for opening and closing a wastegate duct 45, and a spring element 37 which is arranged between the flap lever and a disc 36 which is fastened to the flap lever 35.

By contrast to the flap arrangement 10, in the alternative embodiment according to FIG. 8, a convex or spherically formed sliding contact surface 39 is arranged on the disc 36, which sliding contact surface adjoins a planar surface 38 on the disc 36 at the outer circumferential side, as can be seen in detail from FIG. 8. An outer circumferential region 42 of the spring element 37 is supported on said sliding contact surface 39. A central region 43 of the spring element 37, said central region being adjacent to a projection 41 which extends through the spring element 37 and corresponds to the projection 16 of the flap arrangement 10, is supported on a planar surface 40 which is arranged on the flap lever or the spindle 35. It is possible with said embodiment to attain the same effects as with the embodiment of the flap arrangement 10.

In particular, FIG. 4 shows the design of a first contact surface 21 on the flap plate 11 and of a second contact surface 22 on the flap lever 12. The two contact surfaces 21, 22 bear against one another along a circular line. For this purpose, the first contact surface 21 is of convex form, in particular in the form of a spherical surface. The second contact surface 22 is of conical form. The two contact surfaces 21, 22, in one case, may be of conical and spherical form, and in the other case, may be of only spherical form.

As a result of the design according to the invention of the two contact surfaces 21, 22, the flap plate 11 is movable relative to the flap lever 12, such that sealing abutment of the flap plate 11 against the wastegate duct 45 is always possible. By means of the spring element 17, play-free abutment of the flap plate 11 against the flap lever 12 is ensured. By means of the special design of the spring element 17 and of the sliding contact surface 20, a progressive spring characteristic curve is possible, wherein the spring characteristic curve can be influenced by means of the radius of curvature on the sliding contact surface 20 and/or the design and connection of the spring arms.

Figure 6:
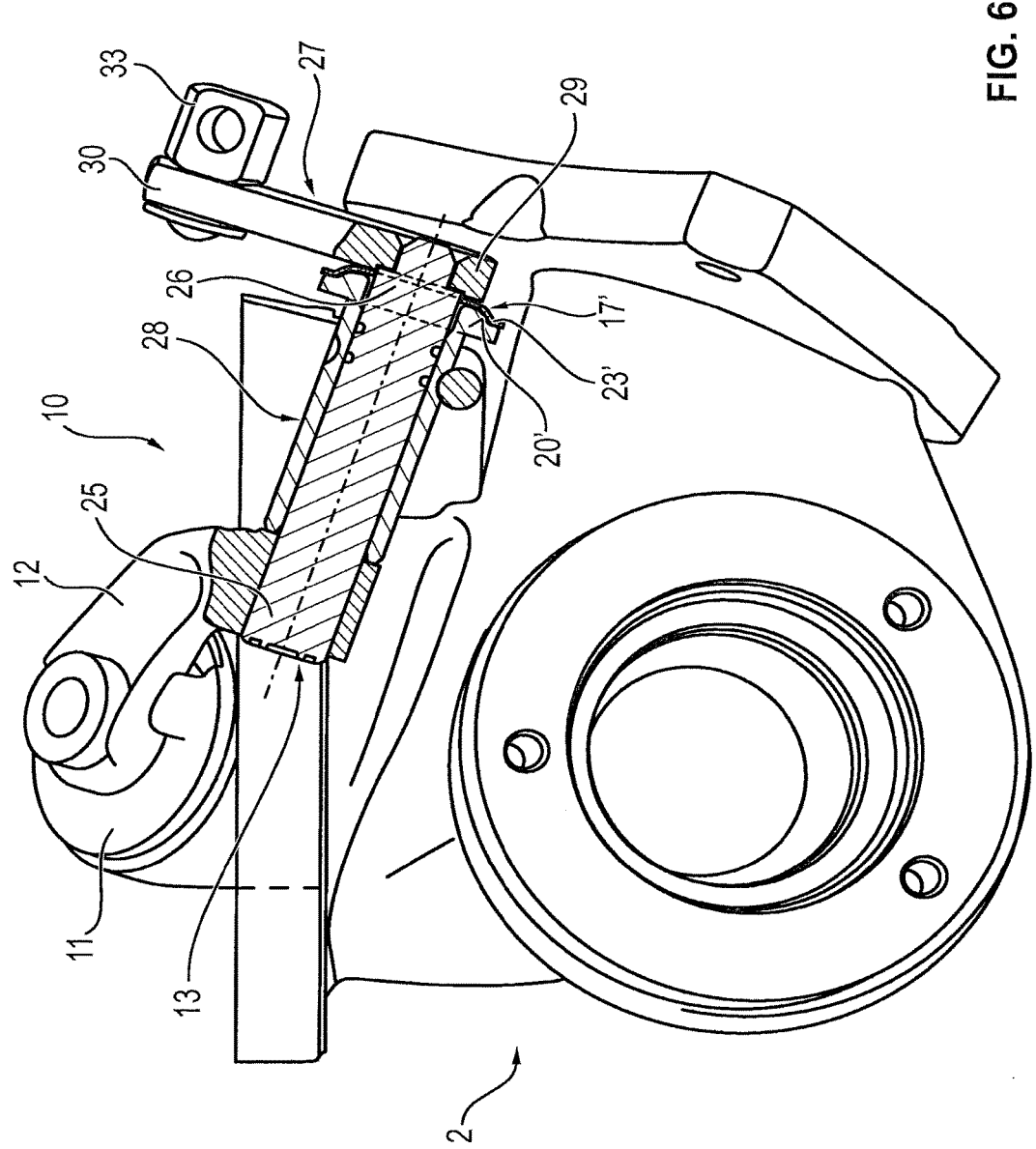
FIG. 6 shows a partially sectional perspective illustration of a further embodiment of the turbocharger according to the invention.

FIG. 6 shows a further preferred embodiment of the exhaust-gas turbocharger according to the invention, wherein said figure illustrates only the turbine housing 2 with its components and with the flap arrangement 10. In said embodiment, the flap shaft 13 is guided in a bushing 28 arranged in the turbine housing 2. An inner end 25 of the flap shaft 13 is connected to the spindle 12. The outer end 26 of the flap shaft 13 is connected to a first end region 29 of an outside lever 27. The second free end region 30 can be connected via a connecting piece 33 to the control rod (not illustrated in FIG. 2) of the actuator.

Figure 7:
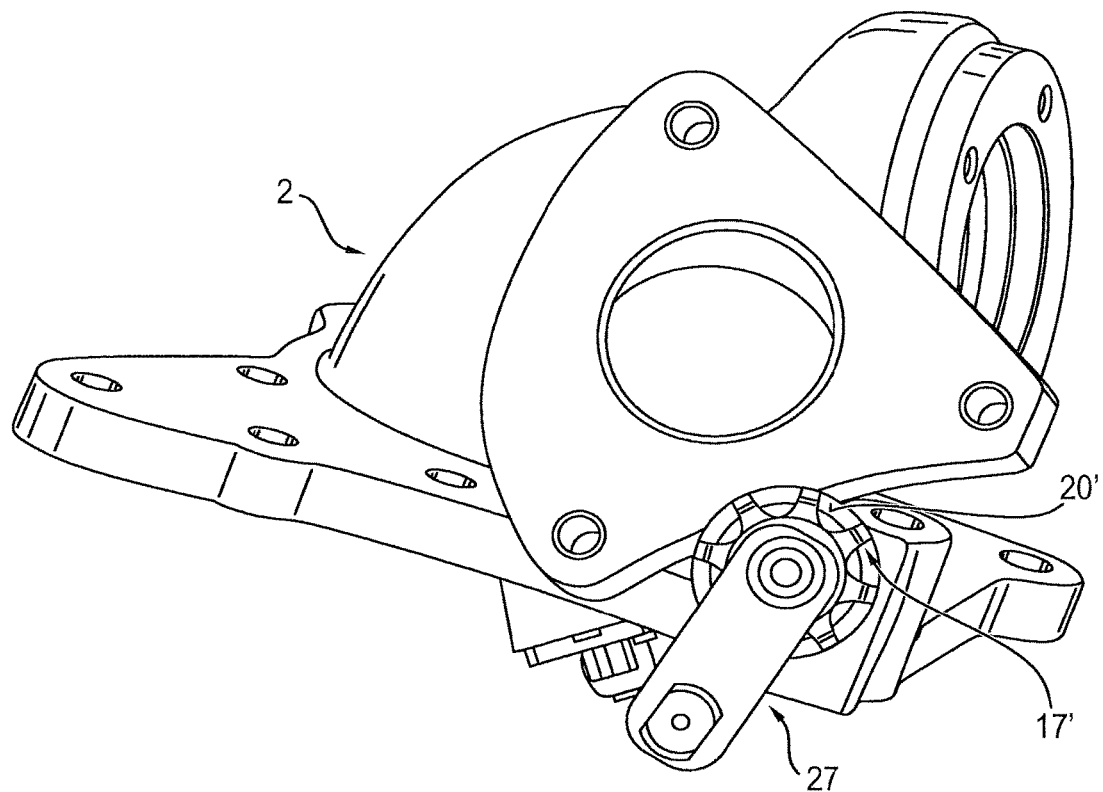
FIG. 7 shows a second perspective illustration of the embodiment as per FIG. 6, with a plan view of the outside lever of the flap arrangement.

As is evident when viewing FIGS. 6 and 7 together, a spring element 17 is arranged between the outside lever 27 and the bushing 28, which spring element has an outer circumferential region 23' which bears against a curved end-side sliding contact surface 20' of the bushing 28. Said design corresponds to that which has been illustrated in particular on the basis of FIG. 5, and serves, in said region of the flap arrangement 10, to provide vibration damping between the bushing 28 and the outside lever 27, as has been explained in detail above in the introductory part of the description. Accordingly, the design of the spring element 17' may correspond to that of the spring element 17, and the design of the end surface of the bushing 28 may correspond to the design of the sliding contact surface of the spindle 12, such that reference is made to said description.

In addition to the above written description of the invention, reference is hereby explicitly made, for additional disclosure thereof, to the diagrammatic illustration of the invention in FIGS. 1 to 8.

LIST OF REFERENCE NUMBERS

1 Exhaust-gas turbocharger
2 Turbine housing
3 Compressor housing
4 Bearing housing
5 Turbine wheel
6 Shaft
7 Compressor wheel
8 Turbine housing inlet
9 Turbine housing outlet
10 Flap arrangement
11 Flap plate
12 Flap lever/spindle
13 Flap shaft
14 Control rod
15 Actuator
16 Projection
17 Spring element
18 Disc
19 Spring arms
20 Sliding contact surface
20' End-side sliding contact surface
21 First contact surface
22 Second contact surface
23, 23' Outer circumferential region
24 Opening
25 Inner end of the flap shaft 13
26 Outer end of the flap shaft 13
27 Outside lever
28 Bushing
29 End region
30 End region
31 Planar surface
32 Top side
33 Flap arrangement
34 Flap plate
35 Flap lever/spindle
36 Disc
37 Spring element
38 Planar surface of the disc 36
39 Sliding contact surface
40 Planar surface of the spindle 35
41 Projection
42 Outer circumferential region of the spring element 37
43 Central region of the spring element 37
44 Opening in the spindle 35 for the passage of the projection 41

The invention claimed is:

1. An exhaust-gas turbocharger (1) comprising:
a turbine housing (2) comprising a turbine housing inlet (8) and a turbine housing outlet (9) for exhaust gas, and a wastegate duct (45) located between the turbine housing inlet (8) and the turbine housing outlet (9), and
a flap arrangement (33) comprising a pivotable flap lever (35) having an opening (44), a flap plate (34) mounted to one side of the flap lever (35), the flap plate (34) connected to a disc (36) on an another side of the flap lever (35) via a projection (41) extending through the opening (44), the flap plate (34) positioned for opening and closing the wastegate duct (45), the opening (44) having a diameter, the projection (41) having a diameter, the diameter of the opening (44) being greater than the diameter of the projection (41), and a spring element (37) which is braced between the flap lever (35) and the disc (36),
wherein a curved sliding contact surface (39) is provided on the disc (36), facing the spring element (37), and
wherein the spring element (37) has an outer circumferential region (42) which is curved and supported on the curved sliding contact surface (39) of the disc (36) such that when the flap plate (34) is oblique in relation to the flap lever (35) the spring element (37) can slide freely along the sliding contact surface (39).

2. The exhaust-gas turbocharger as claimed in claim 1, wherein the flap arrangement (33) has a first contact surface (21) on the flap plate (34) and a second contact surface (22), situated opposite the first contact surface (21), on the flap lever (35), wherein the two contact surfaces (21, 22) bear against one another only via a line of contact.

3. The exhaust-gas turbocharger as claimed in claim 2, wherein the first contact surface (21) is of convex form and the second contact surface (22) is of conical form, wherein the first contact surface (21) is of conical form and the second contact surface (22) is of convex form, wherein the first contact surface (21) is of convex form and the second contact surface (22) is of convex form.

4. The exhaust-gas turbocharger as claimed in claim 2, wherein the first contact surface (21) is spherical and the second contact surface (22) is conical.

5. The exhaust-gas turbocharger as claimed in claim 1, wherein the sliding contact surface (42) is spherically curved.

6. The exhaust-gas turbocharger as claimed in claim 1, wherein the spring element (37) comprises at least three radially projecting spring arms (19) or is in the form of a spherical disc.

7. The exhaust-gas turbocharger as claimed in claim 6, wherein the spring arms (19) are spherically curved or are of linear or planar form.

8. The exhaust-gas turbocharger as claimed in claim 1, wherein the flap arrangement (33) comprises a flap shaft (13) which is rotatably mounted in the turbine housing (2) in a bushing (28), wherein the flap lever (35) is rotationally conjointly connected to an inner end (25) of the flap shaft (13), and the outer end (26) of the flap shaft (13) is rotationally conjointly connected to a first end (29) of an outside lever (27), and the outside lever (27) is connected at a second end (30) to a control rod (14) of an actuator (15).

9. An exhaust-gas turbocharger, comprising:
a turbine housing (2) which has a turbine housing inlet (8) and a turbine housing outlet (9) for exhaust gas, and which has a wastegate duct (45) between the turbine housing inlet (8) and the turbine housing outlet (9), and
a flap arrangement (10) comprising a pivotable flap lever (12), a flap plate (11), which is connected to the flap lever (12), for opening and closing the wastegate duct (45), and a flap shaft (13) which is rotatably mounted in the turbine housing (2) in a bushing (28), wherein the flap lever (12) is rotationally conjointly connected to an inner end (25) of the flap shaft (13), and the outer end (26) of the flap shaft (13) is rotationally conjointly connected to a first end (29) of an outside lever (27), which outside lever is connected at its second end (30) to the control rod (14) of the actuator (15),
wherein a spring element (17') is arranged between the outside lever (27) and the bushing (18), which spring element has an outer circumferential region (23') which is supported on an end-side sliding contact surface (20'), which is of curved form, of the bushing (28).

\* \* \* \* \*